United States Patent [19]

Fox

[11] 4,367,620

[45] Jan. 11, 1983

[54] VALVED BAG SEALING

[75] Inventor: Harold K. Fox, Minneapolis, Minn.

[73] Assignee: Bemis Company, Inc., Minneapolis, Minn.

[21] Appl. No.: 216,446

[22] Filed: Dec. 15, 1980

[51] Int. Cl.³ .................. B65B 7/06; B65B 51/10
[52] U.S. Cl. ................................. 53/479; 53/481; 53/373; 156/286
[58] Field of Search ............ 53/479, 481, 491, 373, 53/379, 377, 386, 387, 512, 434; 156/285, 286, 583.1, 308.4, 309.6

[56] References Cited

U.S. PATENT DOCUMENTS

| | | | |
|---|---|---|---|
| 2,292,295 | 8/1942 | Royal | 53/479 X |
| 2,419,991 | 5/1947 | Dunning | 53/491 |
| 2,423,237 | 7/1947 | Haslacher | 53/479 X |
| 2,435,878 | 2/1948 | Dunning | 53/491 |
| 2,496,336 | 2/1950 | Cupo | 53/491 X |
| 2,672,268 | 3/1954 | Bower | 53/373 X |
| 3,411,695 | 11/1968 | Cupo | 53/491 X |
| 3,551,232 | 12/1970 | Thompson | 156/286 X |
| 3,764,443 | 10/1973 | Christensson | 53/373 X |
| 3,914,917 | 10/1975 | Young | 53/512 X |

FOREIGN PATENT DOCUMENTS 842927  7/1960  United Kingdom .................. 53/479

*Primary Examiner*—Horace M. Culver
*Attorney, Agent, or Firm*—Clayton R. Johnson

[57] ABSTRACT

A vacuum heater head is provided for sealing the valve of a bag after the bag has been filled through the valve. The head has a generally planar surface with a plurality of spaced recesses opening therethrough, passages being provided in the head to open to the recesses for applying a vacuum therethrough. In two of the embodiments shown, the valve in a bag filled condition has a first wall that at least in part has an exposed exterior wall portion of a relatively high porosity and a second wall having a wall portion in juxtaposed relationship to the exposed wall. The first wall portion may be of paper and the second wall portion of a thermoplastic material, for example polyethylene, or the second of paper or non-thermoplastic with, for example, hot melt adhesive between the wall portions. Upon pressing the bottom surface of the heated vacuumized head against the exposed exterior surface the second wall is drawn against the first wall portion to be adhered thereto to form a seal across at least substantially the entire transverse width of the valve. In another embodiment a generally flat valve member is likewise adhered to the adjacent side closure flap portions to form a sealed valve closure.

10 Claims, 18 Drawing Figures

U.S. Patent Jan. 11, 1983 Sheet 1 of 3 4,367,620
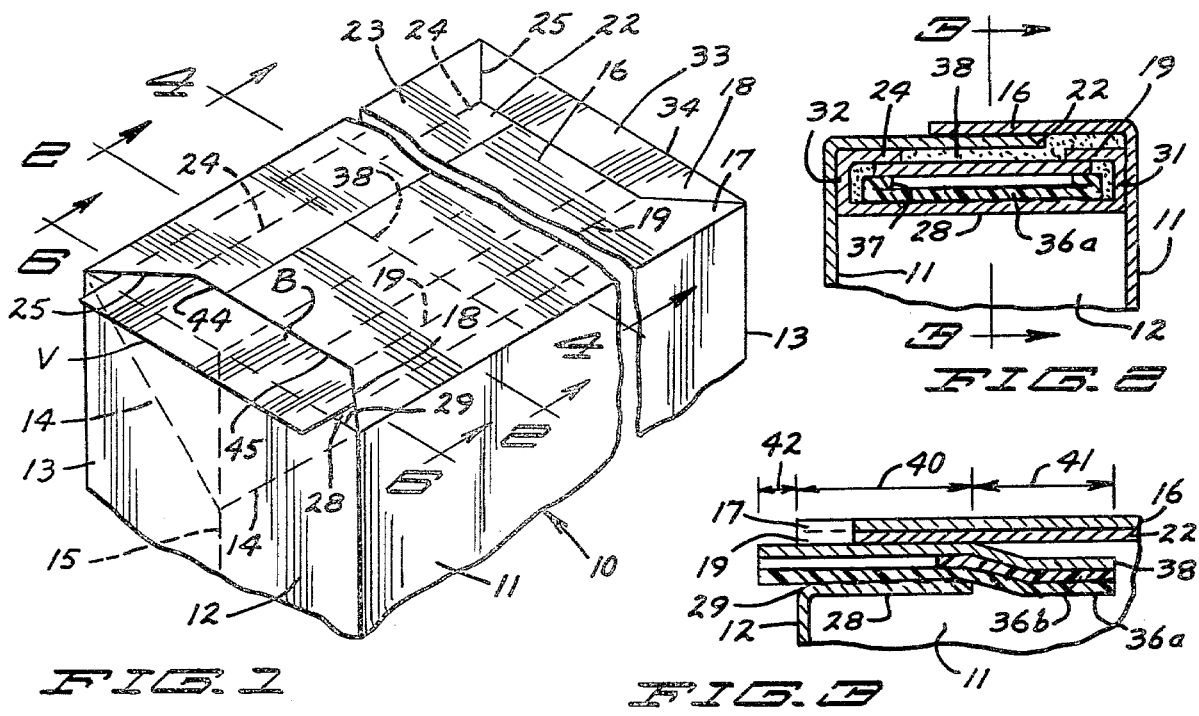
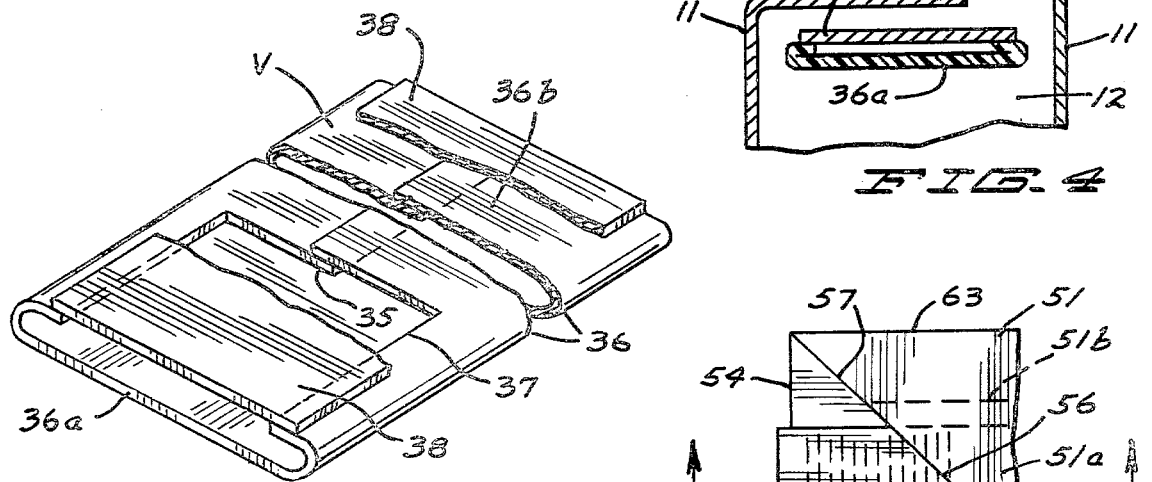
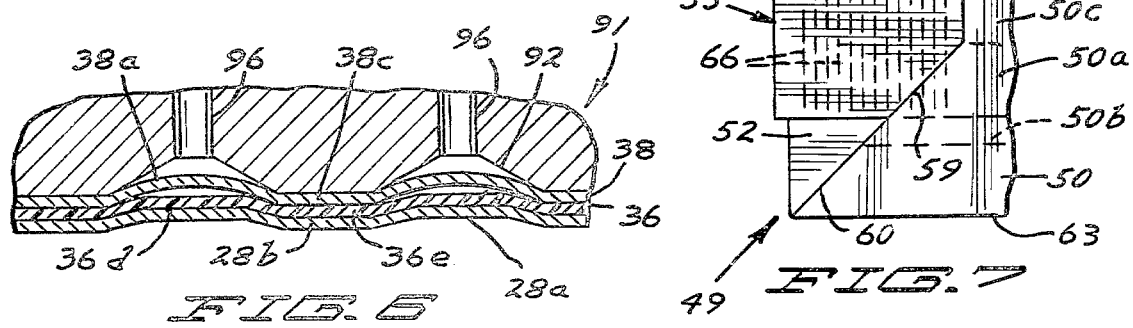

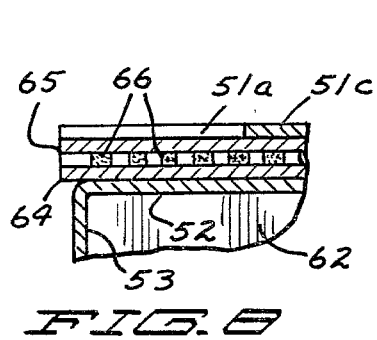
FIG.8
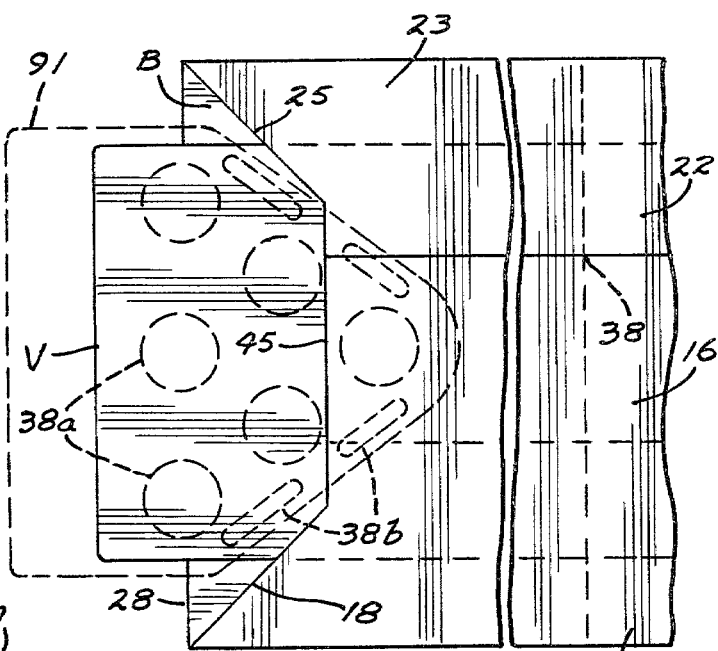
FIG.9
FIG.10
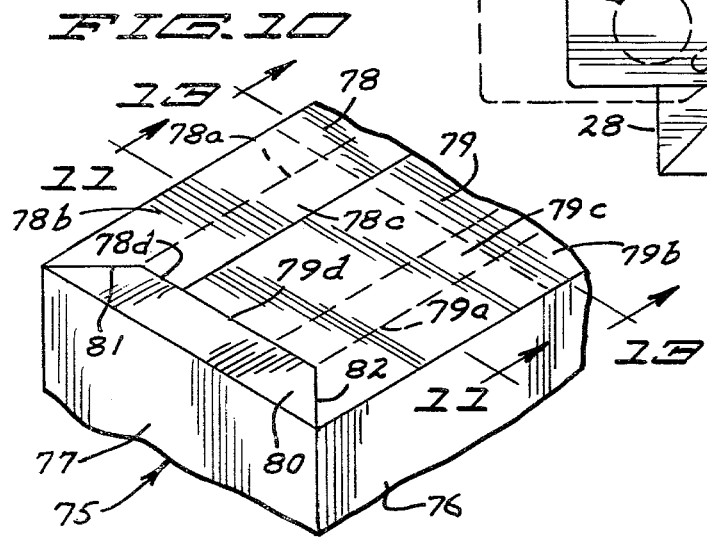
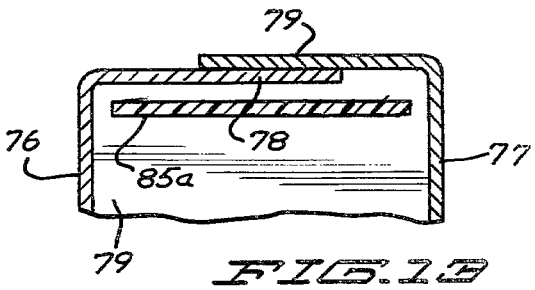
FIG.13
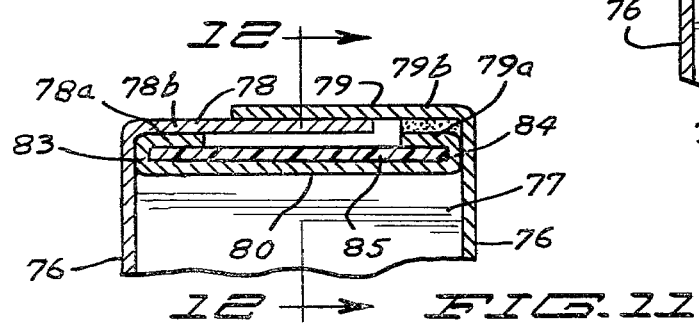
FIG.11
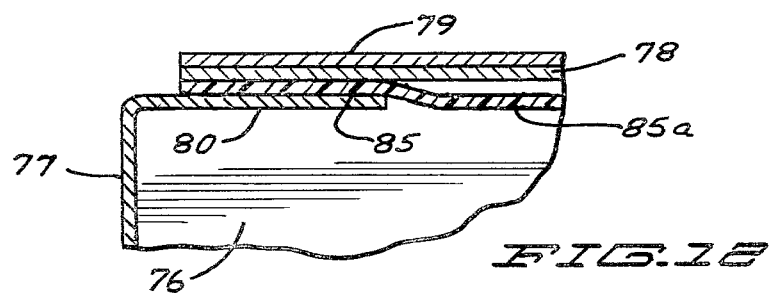
FIG.12

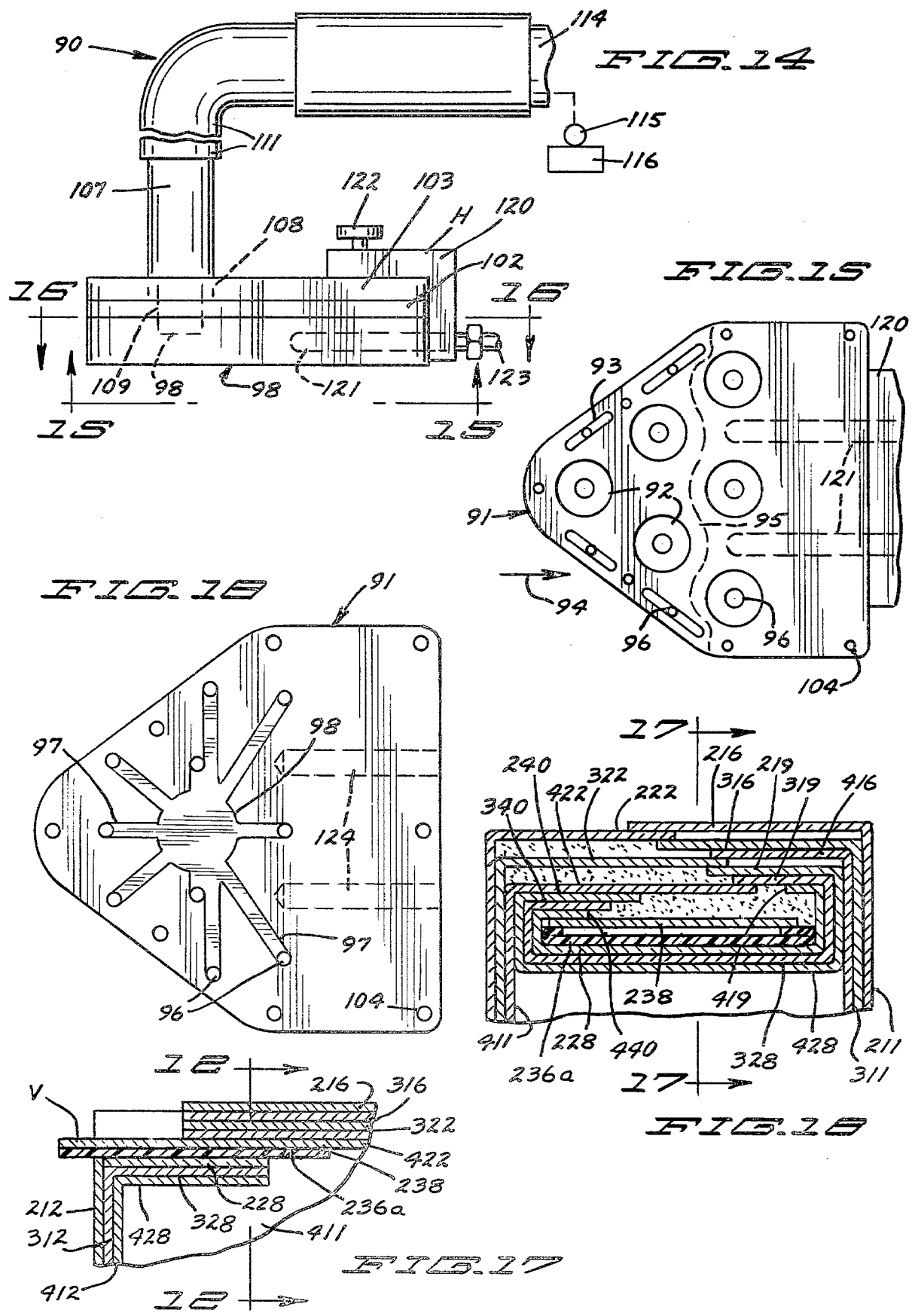

4,367,620

VALVED BAG SEALING

BACKGROUND OF THE INVENTION

It is old to provide bags having valves through which a spout is extended for filling the bag. However, problems have been encountered in attempting to prevent leakage through the valve of the bag after the bag has been filled. One example of a proposed solution to the leakage problem is disclosed in Canadian Pat. No. 661,770 which teaches providing a tuck-in valve sleeve. However, the free end of such a sleeve can slip out of place. Another attempted solution is to heat seal the free end of the valve sleeve in a manner that pressure is applied on opposite sides of the valve sleeve by the heat sealing apparatus. By this procedure, some times holes are burnt in the sleeve.

In order to provide an improved seal on a filled valve bag this invention has been made.

SUMMARY OF THE INVENTION

A bag having a filling valve that has a relatively porous wall portion adhered to a juxtaposed opposite wall portion by applying a heated vacuum head to the porous wall portion which upon the application of a vacuum through the porous wall portion draws the opposite wall portion against the porous wall portion while the heated head results in the two wall portions being adhered to one another to seal the valve after the bag has been filled. The adherence may result from the opposite wall portion being of a thermoplastic material that adheres to the porous wall portion upon being heated and cooled or hot melt adhesive being between the two wall portions, or a coating on one or both of the adjacent surfaces of the wall portions that upon being heated to a sufficiently high temperature and cooled forms a valve seal for the filled valve bag.

BRIEF DESCRIPTION OF THE DRAWINGS

FIG. 1 is a perspective view of the valve bag top closure portion of a filled bag of the first embodiment of the invention that is sealed in accordance with this invention, a longitudinally intermediate part being broken away;

FIG. 2 is a fragmentary transverse cross sectional view of the first embodiment that is generally taken along the line and in the direction of the arrows 2—2 of FIG. 1, the thickness of the illustrated portions of the bag being exaggerated;

FIG. 3 is a fragmentary longitudinal cross section view that is generally taken along the line and in the direction of the arrows 3—3 of FIG. 2 of the valve corner portion of the bag;

FIG. 4 is a fragmentary transverse cross sectional view that is generally taken along the line and in the direction of the arrows 4—4 of FIG. 1 showing the free end portion of the valve sleeve that is within the bag interior;

FIG. 5 is a perspective view of the valve sleeve of FIGS. 2-4 with parts broken away;

FIG. 6 is a fragmentary cross sectional view generally taken along the line and in the direction of the arrows 6—6 of FIG. 1 other than it shows an exposed exterior wall portion of the valve sleeve as it is being adhered to on opposite wall portion of the sleeve;

FIG. 7 is a fragmentary plan view of the valve corner portion of a filled valve bag of the second embodiment;

FIG. 8 is a fragmentary longitudinal cross sectional view generally along the line and in the directions of the arrows 8—8 of FIG. 7;

FIG. 9 is an enlarged fragmentary plan view of the valve corner portion of the first embodiment of a filled bag, said view also showing in dotted lines the positioning of the heated vacuum head relative the bag for sealing the valve thereof;

FIG. 10 is a perspective view of the valve corner portion of the filled bag of the third embodiment of the invention;

FIG. 11 is a fragmentary transverse cross sectional view generally taken along the line and in the direction of the arrows 11—11 of FIG. 10;

FIG. 12 is a fragmentary longitudinal cross sectional view generally taken along the line and in the direction of the arrows 12—12 of FIG. 11;

FIG. 13 is a fragmentary transverse cross sectional view generally taken along the line and in the direction of the arrows 13—13 of FIG. 10;

FIG. 14 is a side view of a vacuum heater head for sealing the valves of a filled bag in accordance with this invention;

FIG. 15 is a bottom view of the head of FIG. 14 that is generally taken along the line and in the direction of the arrows 15—15 of FIG. 14;

FIG. 16 is a top view of the suction plate of the vacuum head of FIG. 14 that is generally taken along the line and in the direction of the arrows 16—16 of FIG. 14;

FIG. 17 is a view that is the same as FIG. 3 other than being of a three ply bag, said view being generally taken along the line and in the direction of the arrows 17—17 of FIG. 18; and FIG. 18 is a view that is the same as FIG. 2 other than being of a three ply bag, said view being generally taken along the line and in the direction of the arrows 18—18 of FIG. 17.

Referring now to FIGS. 1-5, the first embodiment of the invention now will be described. The first embodiment of a valved bag, generally designated 10, may be either a gusseted bag or a type having a diamond fold closure, either of which may be a multi-ply bag or a single ply bag. For purposes of simplifing the description of the invention, primarily only a single ply, diamond fold closure bag will be described. The bag 10 is of a type that in a filled condition has a generally rectangular closure at one end which for convenience will be referred to as a top closure, lines 14, 15 representing fold lines of the bag in a flat folded condition.

The bag 10 in a filled condition has opposite side walls 11, opposite end walls 12 joined to side walls 11 along lines 13, a sealed bottom closure (not shown) joined to walls 11 and 12, and a top closure provided with a valve sleeve V for filling the bag. The top closure includes a side flap having a rectangular portion 16 that along one longitudinal edge is integrally joined to the minor base of an isosclestrapezoidal portion 17. The major base of portion 17 is integrally joined to the top edge of one of the side walls 12 while each opposite edge is integrally joined along a fold line 18 to a longitudinally extending trapezoidal tab 19. The tabs 19 extend toward one another from the respective fold line 18 in underlying relationship to trapezoidal portion 17 and suitably adhered thereto, for example by glue or paste. The adjacent opposite edges of tabs 19 are longitudinally spaced. A second side flap is of the same construction as the first mentioned side flap and includes a rectangular portion 22 having a rectangular terminal edge part in underlying relationship to a corresponding part of the rectangular portion of the first flap and suitably adhered thereto, for example by glue or paste; an isosclestrapezoidal portion 23 having a major base integrally joined to the top edge of the other side wall and trapezoidal tabs 24 integrally joined along fold lines 25 to portion 23. Tabs 24 are adhered to trapezoidal portion 23 in the manner described with reference to tabs 19 being adhered to portion 17 which is conventional.

A generally rectangular end flap 28 has one transverse edge integrally joined to one of the end walls 12 along a fold line 29, one longitudinal edge integrally joined to tab 19 along a fold line 31 and an opposite longitudinal edge integrally joined to tab 24 along a fold line 32. It is noted in FIG. 2 fold lines 31, 32 are shown as being generally rectangular due to the exaggerated thickness of the various parts being illustrated. Likewise, a second rectangular end flap 33 has a transverse edge integrally joined to the opposite end wall along a fold line 34 and longitudinal edges integrally joined to tabs 19, 24 in the same manner as referred to for the juncture of the tabs to the first end flap. The end flaps extend toward one another in underlying relationships to the side flaps and have adjacent, but remotely spaced terminal transverse edges (the terminal edges of tabs 19, 24 and end flap 28 being represented in FIG. 1 by dotted line 38). The abutting surfaces of end flap 33 and the side flaps are conventionally adhered to one another to prevent leakage of bagged product therebetween.

The valve V is extended between end flap 28 and the side wall flaps and advantageously is of tubular such as indicated in FIG. 5. The valve V comprises a tubular plastic member 36, for example made of polyethylene, which may be initially made as a tube or have lapping edges suitably adhered to one another along the length thereof at 35. The tubular member includes a bottom wall portion 36a and a top wall portion 36b. A rectangular cut-out 37 is provided in wall portion 36b to open through one terminal edge thereof and extend nearly the transverse width thereof. A rectangular piece of paper 38 which is of a relatively high porosity is adhered to wall portion 36b, for example adhesively, to extend substantially the length thereof and across the cut-out and have the longitudinal edge portions adhere thereto on both transverse sides of the cut-out. As shown in FIG. 1, preferably the longitudinal length of the valve sleeve V is substantially greater than the corresponding dimension of an end flap.

The lower surface of the valve sleeve is adhered to the end flap 28 along the length and width of part of the flap that underlies wall portion 36a while along the length indicated by dimension line 40 the juxtaposed surfaces of tube 36 and paper 38 are adhered to the juxtaposed surfaces of tabs 19, 24 and side flap portions 16, 17, 22, 23, and the juxtaposed surfaces of tab 24 and flap portion 25, and the juxtaposed surfaces of the side and end flaps are adhered to one another to form a closure seal between the bag and valve other than through the valve sleeve. Advantageously the valve sleeve is of length to have an interior free end portion, the longitudinal length thereof being indicated by dimension line 41, that extends longitudinally beyond end flap 28 toward end flap 33 but terminates short of flap 33. As shown in FIG. 3 the free end portion 41 is not adhered to the adjacent surfaces of the side flaps, although if desired, the juxtaposed surfaces of wall portions 36b and paper 38 and the side flaps may be adhered to one another.

Although not essential, advantageously valve V has an exterior free end portion, the longitudinal length of which is indicated by dimension line 42 in FIG. 3, that extends a short distance outwardly of the adjacent end wall 12 of the filled bag. The length of free end portion 42 is preferable substantially shorter than the exterior free end portion of most conventional tuck-in valves for tuck-in valve bags.

During the manufacture of bag 10, the upper surface of wall portion 36a is not adhered to either the lower surface of paper 38 or to wall portion 36b, assuming that member 35 is tubular or made such as indicated in FIG. 5. In any event the bag with valve is made such that a filling spout can be extended through the valve for filling the bag. To be noted from FIGS. 1 and 3 is that the bag 10 is made in a manner that not only end portion 42 of the upper surface of paper 38 is exposed, but also an area B bounded by longitudinal edges of the valve sleeve longitudinally between fold lines 18, 25, and fold line 29, the terminal transverse edges 44, 45 of flap portions 16, 22 that are adjacent fold line 29, parts of fold lines 18, 25 and a line directly above fold line 29.

Even though valve V as shown in FIG. 1 is of a transverse width that is substantially less than that of end flap 28, it may be of a narrower width, or of a greater width that is substantially the same as that of the end flap. Further the valve may be of a shorter length so that it does not have an exterior free end portion 42.

Additionally it is to be noted that the end flaps advantageously may be formed so that the transverse edges 44, 45 of the rectangular portions of the side flaps are more remotely spaced from fold line 29 and the minor base edges of flaps 19, 24 correspondingly more closely adjacent one another. In such an event exposed area B of the valve sleeve would be greater. Alternately, a part of the rectangular portions of the side flaps could be cut away to provide a greater exposed area B above the valve sleeve. The exposed area B of wall portion 38 is above cut-out 37, i.e. advantageously the cut-out extends more remote from fold line 29 than terminal edges 44, 45.

Referring to FIGS. 7 and 8, the second embodiment of a bag, generally designated 49, is of the same construction as bag 10, except for the differences noted. That is, a filled bag 49 has side flaps 50, 51 joined to side walls 62 along fold lines 63, an end flap 52 joined to the end wall 53 along fold line 54, and a valve generally designated 55. For bag 49 a cut-out has been made in the side flaps along diagonal line 56 from fold line 57 to transverse cut line 58 for flap 51 and along diagonal line 59 from fold line 60 to transverse cut line 61 for flap 50. As a result the altitude of trapezoidal portion 51a of the side flap 51 is much greater than the corresponding dimension of the trapezoidal tab 51b which extends therebeneath and is integrally joined thereto along fold line 57. The above relationship is also applicable to trapezoidal portion 50a of flap 50 relative trapezoidal tab 50b which is integrally joined to portion 50a along fold line 60. The above provides for a greater longitudinal spacing of terminal transverse edges 58, 61 of the respective rectangular side flap portions 50c, 51c from fold line 54 than if cut-out 56, 58, 59, 61 was not provided and the transverse dimensions of tabs 50b, 51b were the same as that shown in FIG. 7.

The valve 55 includes a valve sleeve having a lower wall portion 64 and an upper wall portion 65 that are joined along the longitudinally edges thereof, the valve sleeve being made of a relatively porous paper. The upper surfaces of the upper wall portion 65 is adhesively adhered to the juxtaposed surfaces of the side flaps, except for an interior free end portion such as referred to for free end portion 41 of the first embodiment. The lower surface of the valve sleeve is adhesively adhered to the juxtaposed surface of end flap 52. The juxtaposed surfaces of flaps 50, 51, 52 on each transverse side of the valve sleeve are adhered to one another. The above provides a bag closure seal at the valved end end portion of the bag, except through the valve sleeve. Provided between the juxtaposed surfaces of the upper and lower wall portions of the valve sleeve to extend transversely thereacross is a plurality of hot melt strips 66. The strips are located beneath the exterior exposed surface of the upper wall portion and may be located longitudinally beneath the side flaps. The strips may be continuous or interrupted across the transverse width of the valve sleeve, but if interrupted the breaks in adjacent strips are offset so that when heat activated a good seal will be formed. Instead of strips the upper surface of the lower wall portion may be coated with a material that when heated will form a seal between wall portions 64, 65. The bag 49 is manufactured in a manner that wall portions 64, 65 do not adhere to one another whereby a filling spout can be inserted into the valve for filling the bag.

Referring now to FIGS. 10–13 the bag, generally designated 75, has opposite side walls 76, end walls 77, a first side flap 78, a second side flap 79, and an end flap 80 that are of the same construction and adhered to one another as described with reference to bag 10. The side flaps 78, 79 respectively include trapezoidal tabs 78a, 79a joined to trapezoidal portions 78b, 79b along diagonal fold lines 81, 82 and joined to opposite longitudinal edges of end flap 80 along fold lines 83, 84 (shown rectangular in FIG. 11 due to exaggerated thickness of bag portions as illustrated). The juxtaposed surfaces of the lapping parts of the rectangular portions of the side flaps are adhesively adhered to one another and the juxtaposed surfaces of tabs 78a, 79a are adhesively adhered to the trapezoidal portions 78b, 79 b respectively.

The rectangular portions 78c, 79c have terminal transverse edges 78d, 79d respectively that are longitudinally offset from the end walls. A rectangular valve member 85 extends between one end flap 80 and the adjacent side flap portions 78a, 78b, 78c, 79a, 79b, 79c. The valve member is of a longitudinal length to extend from its transverse edges 78d, 79d to more closely adjacent the end wall opposite that shown in FIG. 10 then the end flap 80 that is joined thereto (see FIG. 12), and is of a transverse width to extend substantially the entire width of the end flap. The juxtaposed surfaces of end flap 80 and the valve member are adhesively adhered. During manufacture of the bag the juxtaposed surfaces of the side flaps and the valve member are not joined, and accordingly a filling spout can be extended therebetween. As may be noted in FIG. 12 the valve member has an interior free end portion 85a, portion 85a extending longitudinally away from the end flap to which the valve member is joined, but terminating remote from the opposite end flap which is not shown in the drawing. Thus a bag top closure seal is provided except for the provision for extending the filling spout into the bag. The side flaps and end flaps in conjunction with the valve member thus provide a valve for filling the bag.

The side flaps are made of a relatively porous material, for example paper, while the valve member advantageously is made of a thermoplastic material such as polyethylene.

Valve member 85 may be shorter so that it does not have a free end portion 85a. Alternately, the valve member may be of a narrower transverse width than that illustrated. In such an event the juxtaposed surfaces of the side flaps and the end flaps advantageously would be adhered to one another.

Referring now to FIGS. 14–16 there is shown a vacuum heater head, generally designated 90, that may be used to seal the valve of a filled bag in accordance with this invention. The head 90 includes a suction plate, generally designated 91, that advantageously may be of a pentagon shape having adjacent right angle corners and an apex angle corner remote from the right angle corners. The suction plate is provided with a plurality of generally frusto-conical recesses 92 having major bases opening through the generally planar lower surface thereof and a plurality of elongated recesses 93 opening through said lower surface. The recesses, for the most part, are located on the apex portion of the plate, and are spaced from one another such that when looking in the direction of the arrow 94 the combination of the recesses extend across substantially the entire transverse width of the plate. The recesses are transversely and longitudinally spaced from one another such that there is at least one planar bottom surface portion path that extends across the transverse width of the generally triangular portion (apex corner portion) of the suction plate, including one path indicated by dotted line 95 adjacent the maximum transverse width of the triangular portion. As may be noted from FIG. 15 some of the recesses 92 are on one longitudinal side of path 95 while other of the recesses are located on the opposite longitudinal side of said path.

Even though it is desirable to have recesses such as 93 that extend along the terminal edge portions of the apex portion bottom surface, recesses 93 can be eliminated. Further, it is to be understood the recesses as viewed in FIG. 15 can be of different shapes as long as they are spaced from one another and in longitudinal and transverse spaced relationship to extend across nearly the entire transverse width of the bottom surface.

For each of the recesses there is provided a bore 96 that at one end opens to the respective recess and at the opposite end opens to one end of one of the grooves 97 provided in the upper portion of the suction plate. The grooves at their opposite ends open to a bore 98 to extend radially outwardly therefrom, the bore 98 opening only through the top portion of the suction plate. Each of the grooves is of a transverse width about the same as the diameter as the respective bore 96 and opens directly to bore 98 whereby in the event one groove is blocked, such blockage will not prevent a vacuum being applied to the other bores 96.

The head 90 includes an insulator plate 102 and a top plate 103, each of which in plan view is of substantially the same size and shape as the suction plate. The insulator plate is located between the suction plate and top plate to reduce the transfer of heat from the suction plate to the top plate. Bolts or screws 104 are extended through the top plate and insulator plate and threaded into the suction plate to retain them in an assembled relationship, the bolts or screws terminating short of the bottom surface of the suction plate. The insulator plate overlies the tops of grooves 97 to provide closed passages from the bores 96 to the bore 98.

The head 90 also includes a handle having a vertical tube 107 that has a lower end portion threaded into an aperture 108 in the top plate, aperture 108 opening to an aperture 109 in the insulator plate which in turn opens to bore 98. The handle also includes a generally right angle elbow 111 threaded on the upper end of tube 107, and a tubular insulator 112, which may be made of rubber or plastic, on one leg of the elbow to provide a hand grip portion. A flexible vacuum tube 114 has one end removable connected to the elbow, the vacuum tube being fluidly connected through a valve 115 to a source of vacuum 116.

A conventional heater subassembly H includes a housing 120 that is bolted to the top plate and mounts a pair of elongated heater elements 121 that extend into longitudinally extending bores 124 in the rectangular portion of the suction plate. A temperature control knob 122 is mounted on the housing and an electric cord 123 is removable connected to the housing for providing power to the heater elements.

Referring to FIGS. 17 and 18 there is shown upper portions of a three ply bag which other than for the number of plys and the amount of lapping of various flaps is of substantially the same construction as the bag of FIG. 1. That is the outer ply has side walls 211, end walls 212, end flaps 228, a side flap having trapezodial and rectangular portions 216 and tab 219, a second side flap having trapezodial and rectangular portions 222 and tab 240, a middle ply having the same parts as the first ply except for being designated by 3XX (311, 312, 328, 316, 319, 322, 340 respectively); and an inner ply having the same parts as the first ply except for being designated by 4XX (411, 412, 428, 416, 419, 422, 440 respectively). Flap portions 216, 222 have lapping portions adhered to one another and juxtaposed surfaces adhered to side flap portion 316. Portions 222, 322 have adhered juxtaposed surface. Juxtaposed surfaces of side flap portions 316, 416 are adhered to one another while the lapping parts of portions 316, 416 are adhered to portion 322. Juxtaposed surfaces of portion 416 and tab 219 are adhered while portion 416 is adhered to the juxtaposed surface of flap 322 and tab 219. Juxtaposed surface portions of tab 319 are adhered to side flap portion 422, valve member top wall 238 and tab 419, the top wall also being adhered to juxtaposed surface portions of portions 422 and tabs 240, 340, 440. Juxtaposed surfaces of portions 322, 422 are adhered to one another. Tab 240 has portions adhered to portion 422 and tab 440. One surface of end flap 328 is adhered to end flap 428 while the opposite surface is adhered to end flap 228. The bottom wall 236 of the valve sleeve V is adhered to end flap 238. Valve V of FIGS. 17 and 18 may be of the same construction as that of FIG. 6, or that of FIG. 5, or of other constructions as long as it has a relatively top porous wall through which a vacuum can be applied to the bottom walls and heat applied therethrough to adhere the two walls together as will be described with reference to the various embodiments. Preferably the wall 238 includes an exterior exposed area such as area B of FIG. 1 overlapping the end flap plys for the application of vacuum and heat to form the valve closure seal after the bag has been filled as will be described with reference to the various embodiments. Thus before filling, the bag of FIGS. 17 and 18 is sealed other than through the valve sleeve.

It is to be noted in FIG. 18 (also FIGS. 2 and 11) that due to the exaggerated showing of the thickness of various parts adhesive is shown as being of exaggerated thickness, where illustrated, but is not shown at all in the places where various parts are adhered. Further, the adhesive is not shown in FIGS. 3, 4, 7, 8, 12, 13 and 17.

Referring now to FIGS. 1-6 and 9, after the bag 10 has been filled and assuming the bag is in the upright position of FIG. 1, with the vacuum heater head hot and a vacuum being applied through tube 114 to recesses 92, 93, the head is moved to a position above the valve sleeve and the apex portion bottom surface moved into abutting relationship with exterior exposed portion B of the paper wall member 38 of the valve sleeve. The vacuum draws the adjacent parts of the paper member 38 into the recesses 92, 93 to be shaped as the top part of a bubble as shown at 38a in FIG. 6 for recesses 92. The outline of raised paper portions 38a, 38b for recesses 92, 93 respectively is shown in FIG. 9. Further, due to the porosity of the paper the vacuum is applied through the paper to the adjacent surfaces portions of the thermoplastic wall portion 36a that is beneath the cut-out 37. This results in the parts of the plastic wall portion beneath raised paper portions 38a, 38b being raised at 36d beneath portion 38a and beneath portion 38b (not shown). However, if the plastic is not as stretchable (or deformable) as the paper the amount of raised deformation of the paper relative the surrounding generally flat land portions 38c of the paper will be greater than raised plastic portions 36d (and corresponding raised plastic portions beneath recesses 93) relative the surrounding generally flat land portions 36c of the plastic such as indicated in FIG. 6. Further, with the end flap being adhered to sleeve wall 36a, the parts of the flap beneath recesses 92, 93 will be raised an amount corresponding to that of the adjacent parts of the plastic (indicated at 28a in FIG. 6 for recesses 92).

Due to the raising of parts of paper wall portion 38 of the valve, parts 38c will be stretched so that land 38c will tightly abut against the adjacent parts of the suction plate between the recesses while the raising of parts of plastic wall portion 36d will likewise result in lands 36e being held tightly against lands 38c. Further, since the plastic does not deform as much due to the application of the vacuum as paper wall portion 38, a compressive force is exerted against the juxtaposed paper portions. The head is at a sufficiently high temperature to soften the plastic so that upon cooling the plastic adheres to the abutting parts of wall portion 38 but the temperature is not sufficiently high nor the vacuum sufficiently great to result in rupturing the paper or plastic sleeve portions. Then the vacuum to the head is discontinued and the head moved away from the valve to allow the valve to cool. The above seals the valve across at least substantially the entire transverse width thereof, the head being positioned relative the valve so that a transverse path such as 95 extends across the valve. For forming the valve seal no apparatus abuts against the side of the valve opposite the vacuum head.

Whether or not during the use of the vacuum head wall portion 38 that underlines the adhered lapped parts of side flap portions 16, 22 will adhere to plastic wall 36a depends on the porosity of said lapped portion and adhesive and if cut-out 37 is of a depth to extend beneath such lapped portions. The part 42 of the sleeve extending longitudinally outwardly of the adjacent side wall 12 will have the land parts 36c between transversely adjacent head recesses adhered to adjacent land parts 38c due to the application of heat by the head.

The manner of forming the valve seal for the second embodiment of FIGS. 7 and 8 is the same as that described for the first embodiment of FIGS. 1-5 except that instead of heating valve wall portion sufficiently that it adhered to paper wall portion 38, the hot melt strips 66 are heated sufficiently so as to adhere paper wall portion 65 to paper wall portion 64. A valve seal would be formed in the same manner as that above mentioned for the second embodiment if instead of hot melt strips the upper surface of wall portion 64 were coated with a heat activated sealing material.

As to the embodiment of FIGS. 10-13, the side flaps 78, 79 and the material and/or manner of adhering one flap to the other provides a top closure of sufficient porosity that the application of vacuum through the vacuum head draws the part of valve member 85 beneath the recesses against the side wall flaps to be adhered thereto, in a manner corresponding to that described relative sealing the valve sleeve portion 38 above the cut-out 37 to wall portion 36a. In this connection raised portions corresponding to raised portions 38a, 36d, 38b are formed in the side flap and valve member 85.

It is to be understood that in place of using a thermoplastic valve member 85, member 85 may be made of paper having the upper surface of the portion to be sealed to flaps 78, 79 coated with a suitable heat activated material or heat melt strips such as referred to with the second embodiment.

Even though the description has been with reference to the illustrated closure being a top closure it is to be understood the same valve seal can be made for example, if the left vertical end wall 12 in FIG. 1 is a horizontal top wall and the top closure extends vertically instead of horizontally as illustrated.

What is claimed is:

1. A method of forming a sealed valve bag top closure on a filled valve bag that in an upright condition has juxtaposed bag top closure wall portions including at least one relatively porous upper wall portion and a valve member adherable to at least one upper wall portion through the application of heat and cooling to form a valve closure, said valve member extending below and along at least part of the lower surface of said at least one wall portion, comprising heating a heater vacuum head, applying a vacuum through the heated vacuum head through the at least one upper wall portion after the bag is filled to draw at least part of the valve member against the adjacent part of the at least one upper wall portion and the at least one upper wall portion against the head, and heat said parts sufficiently that after cooling the said parts adhere to one another to form a valve closure seal, then discontinuing the application of the vacuum through the vacuum head, and thence moving the vacuum head away from the bag and allowing the valve member and the at least one upper wall portion to cool to form the sealed valve closure.

2. The method of claim 1 further characterized in that the valve member part is of a thermoplastic material adherable to said at least one wall portion part.

3. The method of claim 1 further characterized in that the valve member has a surface facing the at least one wall portion that is coated with a heat activated sealing material which during the heating and cooling adheres to the at least one wall portion part.

4. The method of claim 1 further characterized in that the vacuum head has a bottom surface and a plurality of spaced recesses opening through the bottom surface for applying a vacuum through the recesses to form raised wall portions surrounded by generally flat lands when the vacuum is applied to said at least one wall portion.

5. The method of claim 4 further characterized in that the valve member comprises a wall portion having a hot melt adhesive thereon facing the at least one wall portion part that adheres to said upper wall portion part upon carrying out said heating and cooling step.

6. The method of claim 1 further characterized in that the top closure wall portions includes an end wall flap that extends in underlying relationship to at least part of the valve member and is adhered thereto prior to filling the bag.

7. The method of claim 6 further characterized in that the at least one wall portion comprises a side flap that is integrally joined to a bag side wall and extends in overlaying relationship to the valve member to extend transversely toward the opposite bag side wall, the application vacuum and heat being to said side flap for adhering the valve member thereto.

8. The method of claim 6 further characterized in that the valve defining wall portions comprises a valve top wall portion joined to the valve member to form a valve sleeve and that the bag top closure includes a flap that underlies at least part of the valve member and is adhered thereto prior to filling the bag and a flap overlaying at least part of the valve top wall portion and is adhered thereto prior to filling the bag, the vacuum and heat being applied through the valve top wall portion to draw the valve member against the valve top wall portion for adherence thereto.

9. The method of claim 8 further characterized in that said top wall portion has an exterior exposed area that is directly above the valve member and that the flap to which the valve member is adhered has an area thereof directly below the part of the valve member that is directly below the exposed area, and that the vacuum and heat is applied to said exterior exposed area.

10. The method of claim 9 wherein the first mentioned flap is integrally joined to a bag end wall and that the valve sleeve extends exteriorily, longitudinally outwardly from the last mentioned wall in a direction away from the bag opposite end wall, further characterized in that at least part of the valve top wall portion that extends outwardly is adhered to the valve member across at least a major portion of the transverse width thereof.

* * * * *